(12) United States Patent
Yamamoto et al.

(10) Patent No.: US 6,505,822 B1
(45) Date of Patent: Jan. 14, 2003

(54) LIQUID-SEALED VIBRATION-PROOF DEVICE

(75) Inventors: Hikofumi Yamamoto, Osaka (JP); Kentaro Yamamoto, Osaka (JP); Yukio Takashima, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 0 days.

(21) Appl. No.: 09/941,261

(22) Filed: Aug. 28, 2001

(30) Foreign Application Priority Data

Aug. 7, 2001 (JP) ........................... 2001-239575

(51) Int. Cl.$^7$ ............................... F16F 13/00
(52) U.S. Cl. .................. 267/140.13; 267/141.1
(58) Field of Search ............... 267/140.11, 140.13, 267/140.4, 141, 141.1, 141.4, 141.5, 219, 292

(56) References Cited

U.S. PATENT DOCUMENTS 4,711,206 A    12/1987   Andrae et al.
4,742,999 A    5/1988    Flower
4,986,510 A    1/1991    Bellamy et al.

FOREIGN PATENT DOCUMENTS

JP    2000-230600    8/2000
JP    2001-20992     1/2001

*Primary Examiner*—Pam Rodriguez
(74) *Attorney, Agent, or Firm*—Jordan and Hamburg LLP

(57) ABSTRACT

A liquid-sealed vibration-proof device is constructed so that a partition dividing its interior into a main and a subsidiary liquid chamber comprises an orifice member having an orifice, a partition plate member provided subjacently in contact with the orifice member, and an elastomeric membrane interposed between a central plate section of the orifice member and the partition plate member. The elastomeric membrane includes a central plate-form portion held and pinched by the orifice and partition plate members, and a diaphragm portion extending outboard it to terminate at an open end which is slidably brought in pressure contact with an annular wall section of the orifice member. Openings are provided in the central plate section and the partition plate member holding and pinching the central plate-form portion, which is partly exposed to both chambers, as an elastic membrane capable of elastic deformation.

10 Claims, 3 Drawing Sheets

LIQUID-SEALED VIBRATION-PROOF DEVICE

BACKGROUND OF THE INVENTION

1. Field of the Invention

This invention relates to a liquid-sealed vibration-proof device used for supporting and bearing a vibration generator mainly such as automobile engines, etc. in a vibration-isolating manner.

2. Description of the Related Art

As a mount for supporting and bearing a vibration generator, e.g. automobile engine, etc. so as not to transmit its vibration to the vehicle body, there is known a liquid-sealed type of vibration-proof device.

Such vibration-proof device is comprised of a cylindrical main body fitting to be attached and fastened to the support side, e.g., the vehicle body frame, an upper fitting to be attached to the vibration generator side,. e.g., engine, a thick-walled vibration-insulating base made of rubber material and assuming a generally truncated cone configuration interconnecting the main body fitting and the upper fitting, a diaphragm provided opposite to the vibration-insulating base at the lower side of the main body fitting, and a liquid-sealed chamber enclosed between the vibration-insulating base, and the diaphragm, the liquid-sealed chamber including two liquid sub-chambers on the base side and the diaphragm side divided by a partition, both sub-chambers communicating through an orifice with each other thereby exhibiting a fluid flow effect between both sub-chambers through the orifice, so that a vibration damping function and a vibration insulating function are performed.

Other ones falling under the aforementioned type of vibration-proof device are also known such that the partition is further provided in its center with a rubber-like elastomer membrane for closing openings in order that vibration damping effect may be attained in a different frequency band or a wide range of frequency bands, or the partition is provided with a movable plate having a valve function to through-holes.

The vibration-proof devices fitted with the elastic membrane or mobile plate above, however, have posed the problems that the elastic membrane has limits in vibrational amplitude of elastic deformation and as such has its limitations in reduction of the dependency on vibrational amplitude, or that the mobile plate impinges strongly on the stopper for limiting the movement of the mobile plate in a wide area of it to generate abnormal or strange sound.

Therefore in order to solve the problems with the vibration-proof device stated above, the present inventors have formerly proposed such a construction that the partition dividing the interior into a main liquid chamber and a subsidiary liquid chamber comprises an orifice member having at its outer circumference an orifice channel, a partition member provided in contact with the lower side of the orifice member and supporting the orifice member between it and the vibration-insulating base, and a rubber-like elastomer membrane interposed between both members and having an open end sliding movable to the inner surface of the orifice member (PCT/JP01/02718).

This invention is designed to further improve the aforesaid vibration-proof device as proposed on the configuration and supporting structure of the rubber-like elastomer membrane, and to provide a liquid-sealed vibration-proof device with which it is possible to preclude generation of abnormal sound, to reduce the dependency on vibration amplitude, to exhibit a vibration-proof effect over a considerably wide rage of frequency bands ranging from low frequency band to medium and high frequency bands, and to fabricate the device in a light weight configuration at inexpensive cost.

SUMMARY OF THE INVENTION

Accordingly, this invention is, in generic terms, concerned with a liquid-sealed vibration-proof device comprising a vibration-insulating base as a vibration-proof device proper, a diaphragm opposed thereto, a liquid-sealed chamber enclosed between the vibration-insulating base and the diaphragm, the chamber including a main liquid chamber on the vibration-insulating base side and a subsidiary liquid chamber on the diaphragm side partitioned, and a partition having an orifice for putting both chambers into communication with each other. And the device is characterized in that the partition comprises an orifice member including an annular wall section having an orifice channel defined at its outer circumference and a central plate section having a plurality of openings; a partition plate member provided in contact with a lower side of the orifice member to support the orifice member between it and the vibration-insulating base; and a rubber-like elastomer membrane disposed within a space between the central plate section of the orifice member and the partition plate member, the rubber-like elastomer membrane including a central plate-form portion held by and pinched between the orifice member and the partition plate member, and a diaphragm portion extending outwardly of the central plate-form portion and having at its outer circumference an open end, the open end.being brought into pressure contact with an inner peripheral surface of the annular wall section of the orifice member in a sliding movable manner; and openings are provided at such positions that the central plate section of the orifice member and the partition plate member pinch and hold the central plate-form portion of the rubber-like elastomer membrane between them, the central plate-form portion being partly exposed at the openings to the main liquid chamber and the subsidiary liquid chamber, thus being formed as an elastic membrane capable of elastic deformations.

According to this liquid-sealed vibration-proof device, the diaphragm portion of the rubber-like elastomer membrane of the partition is slidingly movable to the inner circumferential surface of the annular wall section of the orifice member, thus capable of sliding displacing depending on a pressure difference between the main and subsidiary liquid chambers; and furthermore, part of the central plate-form portion held by and between the central plate section of the orifice member and the partition plate member is exposed to both the main chamber. and subsidiary chamber and is capable of elastic deformation due to a liquid difference between both chambers. Hence it is possible to minimize the dependency on vibrational amplitude and to reduce the dynamic spring rate over a considerably wide range of frequency bands from medium to high frequency band. Upon vibration in a low frequency and large vibrational amplitude, the open end of the diaphragm portion of the rubber-like elastomer membrane, abuts on the inner surface of the orifice member and the partition plate member thereby inhibiting further sliding displacement and accordingly, the liquid flows through the orifice located at the outer cirumference of the partition, whereby a high damping can be attained. Consequently, a good vibration-isolating effect can be exhibited over a wide range of frequency bands.

Furthermore, the diaphragm portion of the rubber-like elastomer membrane in a cantilevered state slides, at its open end, toward the inner peripheral surface of the annular wall section of the orifice member and comes to abut on the partition plate member from the open end. Thus the prior art defect with the mobile plate having a valve function that it impinges on the stopper for limiting its movement in a wide area is avoided and generation of abnormal sound (hitting sound) can be reduced.

In addition, because of the fact that the rubber-like elastomer membrane is adjacent to and held to be pinched by the central plate section of the orifice member and the partition plate member without vulcanization bonding to both, reinforcing fittings required when vulcanization bonding the rubber-like elastomer membrane are dispensed with. As a consequence, it is possible to reduce the number of component pieces, to fabricate the device easily and at inexpensive cost, and to make it lightweight.

In the liquid-sealed vibration-proof device described above, a structure of the rubber-like elastomer membrane in its supporting state will be specifically stated: The central part of the partition plate member assumes a projecting portion inboard of the annular wall section of the orifice member, and between the projecting portion and the annular wall section, an annular space is thus formed. The rubber-like elastomer membrane is positioned, with the thick-walled lower annular wall of the central plate-form portion thereof fitted and seated on the projecting portion at its outer periphery, and the diaphragm portion can be arranged within the annular space so as to be sliding movable. Thereby the rubber-like elastomer membrane can be securely and stably pinched and fixed in place between the central plate section of the orifice member and the partition plate member without any deviation.

In the device described above, the central plate section of the orifice member and the partition plate member are provided with openings communicating respectively with the diaphragm portion within the space so that liquid pressures of the main liquid chamber and the subsidiary liquid chamber can act on the diaphragm portion of the rubber-like elastomer membrane.

It is preferred in the liquid-sealed vibration-proof device above that the elastic membrane part at the central plate-form portion of the rubber-like elastomer membrane should assume a projecting shape so as to be fitted in the opening of the orifice member. This is because the state of the rubber-like elastomer membrane being pinched and held can be stabilized.

Preferably the annular wall section of the orifice member bulges out at its inner peripheral surface inwardly toward the lower side of the central plate section, assuming a radius or curvature, and the diaphragm portion of the rubber-like elastomer membrane has a curved contour conforming nearly to the radius curvature. In particular, it is further desirable that the open end of the diaphragm portion extend to the proximity, of a corner area formed by the inner surface of the annular wall section and the upper surface of the partition plate member. The effect of preventing the generation of abnormal sound which attends on the displacement of the diaphragm portion is thus improved.

When the open end of the diaphragm portion of the rubber-like elastomer membrane is formed thin-walled, a sufficient contact area with the annular wall section of the orifice member can be assured, whereby it is possible to shut off positively between the main and subsidiary liquid chambers without leakage of liquid. This is more preferable in exhibiting a required vibration damping function.

DESCRIPTION OF THE PREFERRED EMBODIMENTS

Preferred embodiments of the invention will be hereinafter described with reference to the accompanying drawings.

Figure 1:
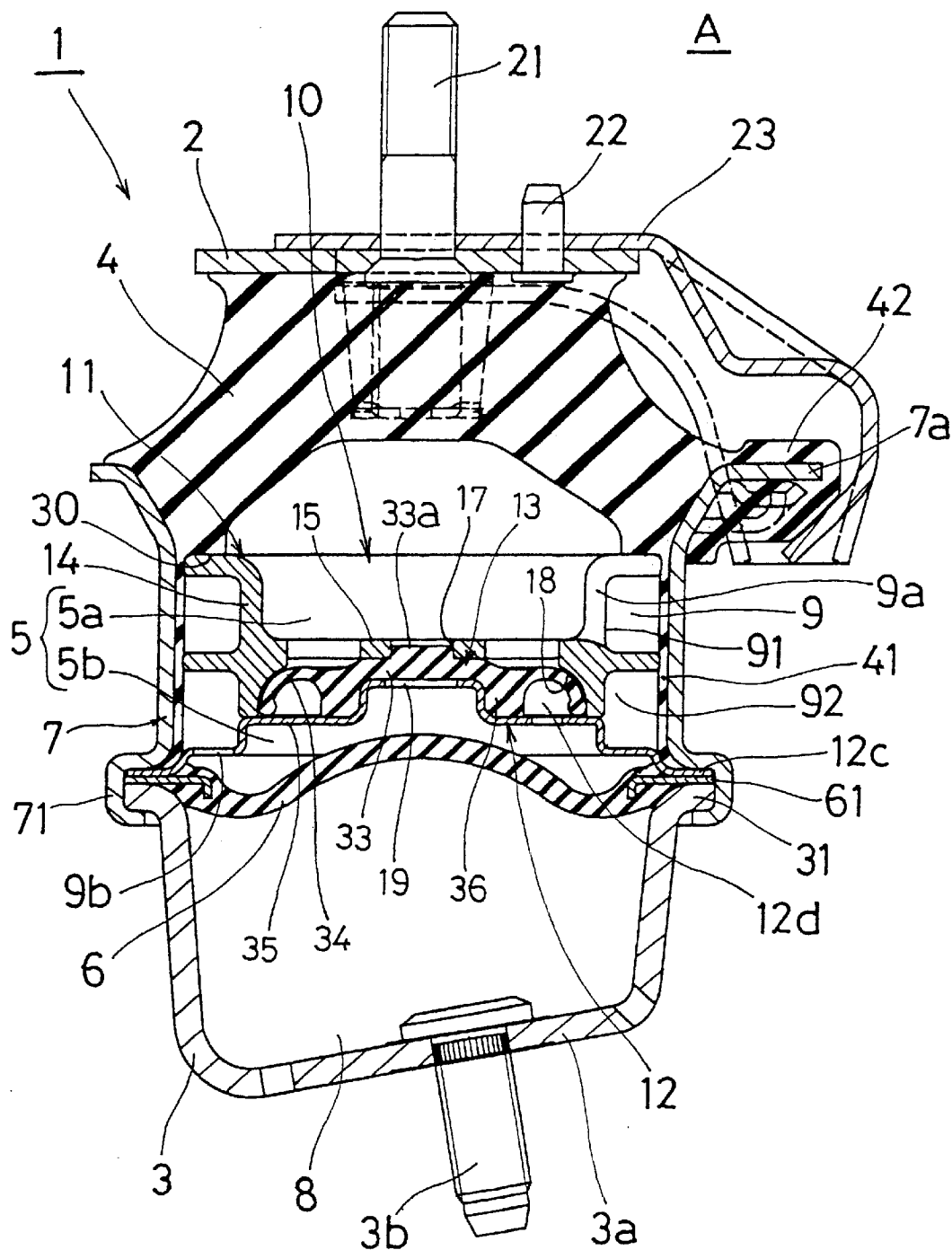
FIG. 1 is a longitudinal sectional view showing one example of a liquid-sealed vibration-proof device according to this invention.
Figure 2:
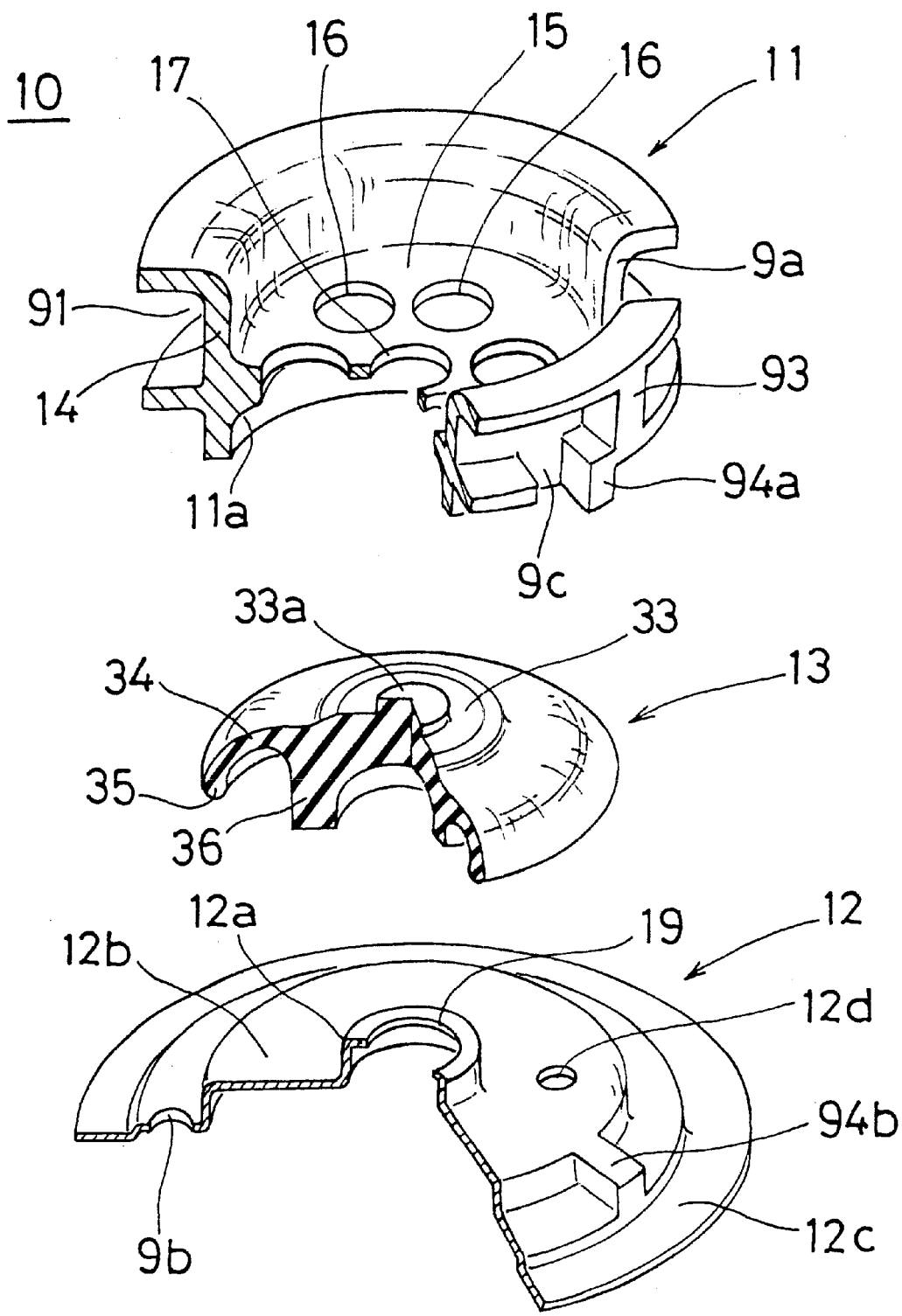
FIG. 2 is a partly sectional, perspective exploded view showing the constituent elements of a partition in the device of FIG. 1.
Figure 3:
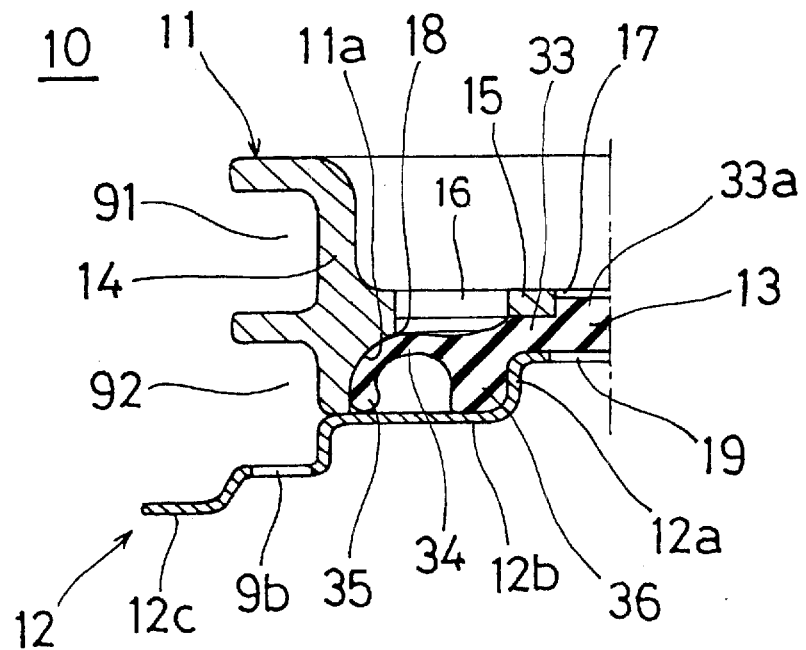
FIG. 3 is an enlarged view of major parts of the partition in the vibration-proof device in FIG. 1.

In the example as shown in FIGS. 1 to 3, a liquid-sealed vibration-proof device A is provided with an upper fitting 2 to be attached to a vibration generator side such as engine, a lower fitting 3 to be attached to a vehicle body side, a vibration-insulating base 4 made of rubber elastomer interconnecting both the fittings 2,3, a diaphragm 6 disposed on the lower fitting 3 side to be opposed to the vibration-insulating base 4, and a liquid-sealed chamber 5 formed between the vibration-insulating base 4 and the diaphragm 6, all of which constitute a vibration-proof device proper 1.

Inside the vibration-proof device proper 1 there is a partition 10 partitioning the liquid-sealed chamber 5 into a main liquid chamber 5a on the vibration-insulating base 4 side and a subsidiary liquid chamber 5b on the diaphragm 6 side. The partition 10 is provided with an orifice 9 and a rubber-like elastomer body 13, as will be described below, so as to exhibit respective vibration damping functions in different frequency bands.

The vibration-insulating base 4 participates in a vibration insulating function and assumes a generally truncated conical shape, and is vulcanization bonded to the upper fitting 2 at its small-diameter, upper end and to a cylindrical main body fitting 7 at its large-diameter, lower outer peripheral portion, the cylindrical main body fitting 7 being connected at its lower end 71 to an open edge 31 of the lower fitting 3 by crimping fastening means.

The upper fitting 2 has a flat plate form and is provided with an attachment bolt 21 protruding upwardly at its center place. The reference numeral 22 is a protrusion for positioning with which it is possible to fasten to a power unit such as an automobile engine. The reference numeral 23 designates a stabilizer provided rigidly to the upper fitting 2, for example, by welding means. The stabilizer 23 is provided in order that when the upper fitting 2 is displaced largely owing to deformation of the vibration-insulating base 4, the stabilizer may abut on an overhang portion 42 provided on the large-diameter portion side of the vibration-insulating base 4, thereby serving to perform a stopper action of restricting further vertical deformation. In the overhang portion 42 is embedded an extension portion 7a extending outboard from a part of the open end of the cylindrical main body fitting 7.

The lower fitting 3 assumes a generally cylindrical bottomed form and its flange-like open edge 31 is fixed by crimping to the lower end 71 of the cylindrical main body fitting 7. In a bottom wall 3a of the lower fitting 3, an attachment bolt 3b to the vehicle body side is provided so as to protrude and face downwardly by press fitting means. A space between the lower fitting 3 and the diaphragm 6 is defined as air chamber 8.

The diaphragm 6 is made of a flexible rubber membrane, and in its outer circumferential portion, an annular support fitting 61 is embedded integrally by vulcanization bonding, at its inner edge, and rests on a flange-form open edge 31 of the lower fitting 3. The annular support fitting 61 and the flange-form open edge 31 are fixed at the lower end 71 of the cylindrical main body fitting 7, together with the outer circumferential edge of the partition 10, which will be described below, by crimping.

The partition 10 is made up of an orifice member 11, a partition plate member 12 and a rubber-like elastomer membrane 13, as illustrated.

The orifice member 11 is made of a molding product mainly from a metal material such as aluminum or a plastics having a required strength such as engineering plastics, and includes an annular wall section 14 having an orifice channel 91 of laterally U-like form in cross-section at its outer circumference and a central plate section 15 covering the inside of the annular wall section 14 and extending from the inner periphery of it so as to constitute a space of inverted U-form downwardly. In the orifice member 11, the annular wall section 14 is airtight fitted and seated at its outer circumference to the cylindrical main body fitting 7 at its inner periphery through a sealing rubber layer 41 which is integrally formed with the vibration-insulating base 4, whereby a space enclosed by the orifice channel 91 and the sealing rubber layer 41 is formed as an orifice 9. The outer upper circumferential edge of the annular wall section 14 is forced to contact with a step portion 30 formed at a circumferential edge of the vibration-insulating base 4 on the main liquid chamber 5a side.

The orifice channel 91 at the outer circumference of the annular wall section 14 has a port 9a on the main liquid chamber 5a side formed at its upper wall. On the other hand, the lower wall of the orifice channel 91 is located somewhat above the lower end of the annular wall section 14 and the underside of the lower wall defines an orifice channel 92 together with the partition plate member 12, which will be described below. The orifice channel 92 communicates with the orifice channel 91 through a communication opening 9c. In the partition plate member 12 enclosing the orifice channel 92 there is formed a port 9b on the subsidiary liquid chamber 5b side. The orifice channels 91, 92 are provided respectively with partition. walls 93, 94 for precluding shortcut between the ports 9a, 9b and the communication opening 9c (cf. FIG. 2). The partition wall 94 of the orifice channel 92 is formed in a manner that a wall part 94a on the orifice member 11 side and a jutting wall part 94b on the partition plate member 12 side are mutually abutted one against the other. The orifice channels above are not always necessary to be formed in two tiers as illustrated in FIG. 2, and their lengths can be set appropriately.

The central plate section 15 is formed with a plurality of openings 16 communicating from the main liquid chamber 5a to a space below the central plate section 15 and furthermore formed in the middle thereof with an opening 17, which will be hereinbelow described. The inner peripheral surface of the annular wall section 14 bulges out inboard toward the lower side of the central plate section 15, assuming a radius curvature. In FIG. 2, the radius or curvature portion 11a is formed with an offset from the underside of the central plate section 15, so that a clearance may be kept between a diaphragm portion 34 of the rubber-like elastomer membrane 13 as described below and the underside of the central plate section 15.

The partition plate member 12 is formed of a plate material such as iron plate by press forming and made up of a cylindrical upwardly projecting section 12a, in its middle, for receiving and holding the rubber-like elastomer membrane 13, a flat plate section 12b for abutting on the lower surface of the annular wall section 14 of the orifice member 11 to force and support it upwardly, and an outer circumferential fixing section 12c formed to be bent from the outer circumferential edge of the flat plate section 12b so as to form the orifice channel 92 and extending outwardly, and fixed by crimping along with the lower fitting 3.

In the state that the partition plate member 12 is fixed by crimping to the outer circumferential fixing section 12c as illustrated, the flat plate section 12b is brought into abutment on the lower side of the annular wall section 14 of the orifice member 11, whereby between the annular wall section 14 and the central plate section 15 of the orifice member 11, a space 18 is formed, in which the rubber-like elastomer membrane 13 is accommodated and arranged. At the same time, the projecting section 12a projects within the space 18 inboard of the annular wall section 14, so that the rubber-like elastomer membrane 13 is adapted to be held between its top edge surface and the central plate section 15 in a pinching manner. On account of the projecting section. 12a, the space 18 assumes an annular form between the projecting section 12a and the annular wall section 14 outboard of it. The projecting section 12a is formed around its top edge with an opening 19 whilst the flat plate section 12b is formed with a through-hole 12d partly communicating with the space 18.

The rubber-like elastomer membrane 13 includes a relatively thick-walled central plate-form portion 33 and the diaphragm portion 34 extending outwardly of the central plate portion 33. The central plate-form portion 33 is held in a pinching manner between the central plate section 15 of the orifice member 11 and the top edge of the projecting section 12a of the partition plate member 12 whereby the outer peripheral end of the diaphragm portion 34 is made an open end 35, which is sliding brought into forcing contact with the inner peripheral surface of the annular wall section 14 of the orifice member 11. The space 18 where the diaphragm portion 34 is disposed communicates through the openings 16 in the central plate section 15 of the orifice member 11 and the through-hole 12d in the flat plate section 12b of the partition plate member 12 with the main liquid chamber 5a and the subsidiary liquid chamber 5b, respectively. Thereby the diaphragm portion 34 is adapted to be displaceable due to a pressure difference between the main liquid chamber 5a and the subsidiary liquid chamber 5b.

In the central plate section 15 of the orifice member 11 pinching and holding the central plate-form portion 33 and in the middle of the projecting section 12a of the partition plate member 12, there are provided openings 17 and 19, respectively, so that the middle part of the central plate-form portion 33 is exposed to the main liquid chamber 5a and the subsidiary liquid chamber 5b at the places of the openings and thereby made an elastic membrane 33a capable of elastic deformation. As illustrated in the figures, the top of the elastic membrane 33a of the central plate-form portion 33 assumes a protruded form conforming to and fitting in the opening 17 part of the orifice member 11 so that a radial deviation can be precluded.

The rubber-like elastomer membrane 13 is further formed as the thick-walled annular wall 36 in the lower, outer peripheral part of the central plate-form portion 33, and accordingly, the central portion is like a thick-walled inverted cup. By being positioned with the annular wall 36 fitted in the outer periphery of the projecting section 12a, the central plate-form portion 33 is held to be pinched between the central plate section 15 and the projecting section 12a. In the state that the central plate-form portion 33 is held to be pinched and cantilevered in this way, the diaphragm portion 34 is arranged to be sliding movable within the space 18.

The diaphragm portion 34 assumes a generally inverted U-form in cross-section outboard of the annular wall 36 and has a curved configuration that nearly corresponds to the radius or curvature part 11a bulging out toward the inner peripheral surface of the annular wall section 14 of the orifice member, in particular, the lower surface of the central plate section 15. Further, the open end 35 at the distal end of the diaphragm portion 34 extends to the proximity of a corner place made by the inner peripheral surface of the annular wall section 14 and the upper surface of the partition plate member 12 whereby the magnitude of sliding displacement of the open end 35 is minimized, thus enhancing the effect of precluding the generation of abnormal sound accompanied with sliding displacement. In the space 18, when the diaphragm portion 34 is under normal liquid pressure, a clearance is ensured so that the liquid can flow through above and below the diaphragm portion 34 as shown in FIGS. 1 and 3.

The open end 35 of the diaphragm portion 34 is formed as a slightly thick-walled roundish shape of a circle in cross-section and as such, a contact area with the annular wall section 14 is secured and sliding displacement can be conducted smoothly, as a result of which the intermediate of the main and subsidiary liquid chambers 5a, 5b can be shut off positively without leakage of liquid.

When fabricating the liquid-sealed vibration-proof device A constructed as above, the orifice member 11, the partition plate member 12 and the rubber-like elastomer membrane 13, as components of the partition 10, are beforehand formed separately. Within a liquid, the cylindrical main body fitting 7 connected to the upper fitting 2 through the vibration-insulating base 4 is set with its lower open side facing upwardly. Under the condition that inside air is excluded, the orifice member 11 prepared above is press fitted airtightly at its inner periphery within the cylindrical main body fitting 7 through the sealing rubber layer 41, with its upper outer circumferential edge put into abutment on the step portion 30 of the vibration-insulating base 4 on the liquid chamber side. Furthermore, above on it, the rubber-like elastomer membrane 13 is inserted inboard of the annular wall section 14 of the orifice member 11 with the annular wall 36 faced upwardly, simultaneously with which the partition plate member 12 is press fitted or inserted until it abuts on a step portion within the open lower end 71, before crimped, of the cylindrical main body fitting 7. At that time, the projecting section 12a of the partition plate member 12 is inserted into and fitted to the annular wall 36. Subsequently, the annular support fitting 61 for the diaphragm 6 is press fitted or inserted.

After the liquid is sealed between the diaphragm 6 and the vibration-insulating base 4 in this way, the resulting thing is removed out into the atmosphere, and the lower fitting 3 is inserted at its open edge 31 into the cylindrical body fitment 7 at its lower edge 71, and fixed by crimping at the lower edge 71. Thus the assembling work is finished.

By assembling in this way, the partition 10 will be held under pinching pressure between the step portion 30 of the vibration-insulating base 4 and the open edge 31 of the lower fitting 3 and besides, the rubber-like elastomer membrane 13 inside it is held under pinching pressure between the central plate section 15 of the orifice member 11 and the partition plate member 12.

On account of this assembling procedure, it is possible to fabricate readily the liquid-sealed vibration-proof device A, wherein liquid is sealed within the vibration-proof device proper 1 including the orifice 9 having a predetermined length and cross-sectional area. That is, the orifice member 11, on the one hand, and the partition plate member 12 and the rubber-like elastomer membrane 13, on the other hand, can be separately press fitted or inserted within the liquid layer and fixed by crimping in the atmosphere, and as such, the assembling process can be simplified. Since the component number of the partition 10 can be minimized, it is possible to fabricate the device easily and economically and to attain its weight reduction The liquid-sealed vibration-proof device A of the invention thus constructed is used with the upper fitting 2 connected to the power unit side, e.g. engine and with the lower fitting 3 fitted to the vehicle body side member.

During use, against a vibration transmitted from a vibration generator such as engine fitted to the upper fitting 2, a vibration-proof effect is exhibited by reason of the liquid therefore flows through the orifice 9 and a sliding displacement and deformation action due to the rubber-like elastomer membrane 13.

In particular, the liquid-sealed vibration-proof device A can exhibit a predetermined vibration damping function because, of the partition 10, the diaphragm portion 34 of the rubber-like elastomer membrane 13, its open end 35 is able to come into pressure contact with the annular wall section 14 of the orifice member 11 in its inner peripheral surface thereby to shut off between the main and subsidiary liquid chambers 5a, 5b and to sliding displace owing to a liquid difference between both liquid chambers, and furthermore, the diaphragm portion 14 itself is able to elastically deform. In addition, the central plate-form portion 33 pinched and held by the central plate section 15 of the orifice member 11 and the partition plate member 12 is partly exposed to both the main and subsidiary liquid chambers 5a, 5b whereby it is made a elastic membrane 33a capable of elastic deformation by a liquid difference between both chambers. Hence the vibration can be damped also by this elastic membrane 33a, and consequently, dependency on vibrational amplitude can be minimized and dynamic spring rate over a considerably wide frequency range of medium and high frequency bands can be reduced.

Figure 4:
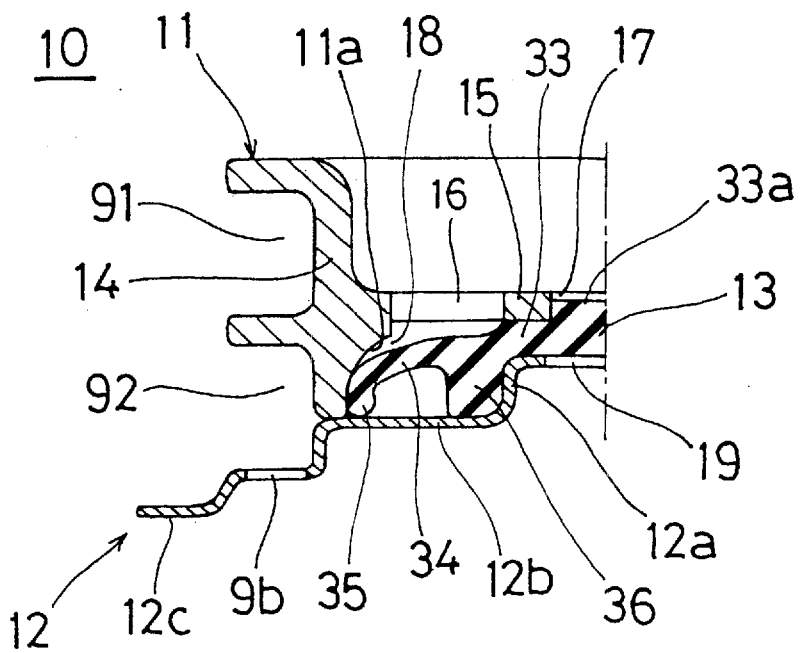
FIG. 4 is a partial sectional view showing a deformation state of a diaphragm portion of a rubber-like elastomer membrane.

Upon vibration at low frequency and large vibrational amplitude, the open end 35 of the diaphragm portion 34 of the rubber-like elastomer membrane 13 is inhibited from further sliding displacing because of the radius or curvature portion 11a of the inner annular wall of the orifice member 11 assuming an overhang form or because of abutment on the partition plate member 12. The liquid therefore flows through the orifice 9 in the outer circumference of the partition 10, and a high damping can be attained. For example, when the liquid pressure on the main liquid chamber 5a side is elevated, the open end 35 of the diaphragm portion 34 abuts on the partition plate member 12 as shown in FIG. 4, whereby further downward sliding displacement is impeded. On the other hand, when the liquid pressure on the subsidiary liquid chamber 5b side rises, the open end 35 abuts on the radius or curvature portion 11a thereby restricting further sliding displacement.

As a consequence, for example, by functioning the orifice 9 for a countermeasure against a shaking vibration at a low frequency, large vibrational amplitude (e.g., 10~15 Hz) and functioning the rubber-like elastomer membrane 13 for the purpose of damping an idling vibration at a medium to high frequency (30~40 Hz), it is possible to exhibit a superior vibration-proof effect over a wide frequency range.

Moreover while the diaphragm portion 34 of the rubber-like elastomer diaphragm 13 is cantilevered, its open end 35 serves to slide toward the inner peripheral surface of the annular wall section 14 of the orifice member 11 to abut on the partition plate member 12 and hence it is possible to reduce the generation of abnormal sound (hitting sound). Thus the defect with the conventional mobile plate type having a valve function that the plate collides with the stopper in a wide area is precluded.

To summarize, the liquid-sealed vibration-proof device according to this invention makes it possible to prevent generation of abnormal sound, to reduce dependency on vibrational amplitude, and to exhibit vibration-proof effect over a considerably wide range of frequency bands of low frequency band and medium, high frequency bands. Furthermore it is possible to fabricate from a reduced number of components into a lightweight one at inexpensive cost. The device so fabricated is therefore suitably used for supporting and bearing a vibration generator, e.g., mainly automobile engines, etc. in a vibration-proof manner.

What we claim is:

1. A liquid-sealed vibration-proof device comprising a vibration-insulating base, a diaphragm opposed to the vibration-insulating base, a liquid-sealed chamber enclosed between the vibration-insulating base and the diaphragm, and a partition having an orifice and dividing the liquid-sealed chamber into a main liquid chamber on the vibration-insulating base side and a subsidiary liquid chamber on the diaphragm side, wherein the partition is made up of:

an orifice member including an annular wall section having an orifice channel at its outer circumference, and a central plate section having a plurality of openings, a partition plate member provided in contact with a lower surface of the orifice member and carrying the orifice member between itself and the vibration-insulating base, and a rubber-like elastomer membrane disposed in a space enclosed between the central plate section of the orifice member and the partition plate member, the rubber-like elastomer membrane including a central plate-form portion held to be pinched between the orifice member and the partition plate member and a diaphragm portion extending outboard from the central plate-form portion in an outer circumferential direction to terminate at an open end, the open end being brought in pressure contact with the annular wall portion of the orifice member at its inner peripheral surface so as to be slidable owing to a liquid pressure difference between the main liquid chamber and the subsidiary liquid chamber;

and wherein the openings are provided at such positions that the central plate section of the orifice member and the partition plate member pinch and hold the central plate-form portion of the rubber-like elastomer membrane between them, the central plate-form portion being partly exposed at the openings to the main and subsidiary liquid chambers and formed as an elastic membrane capable of elastic deformation.

2. The liquid-sealed vibration-proof device as set forth in claim 1, wherein the partition plate member has a central section forming a projecting portion inboard of the annular wall section of the orifice member, the projecting portion and the annular wall section of the orifice member defining an annular space;

the central plate-form portion of the rubber-like elastomer membrane has a thick-walled annular wall in its lower outer circumference so that the thick-walled annular wall is fitted and seated on the outer circumference of said projecting portion to be positioned and the diaphragm portion is disposed within said annular space to be slidable.

3. The liquid-sealed vibration-proof device as set forth in claim 2, wherein the central plate section of the orifice member and the partition plate member have respectively openings communicating with the space.

4. The liquid-sealed vibration-proof device as set forth in claim 2, wherein the elastic membrane of the central plate-form portion assumes a projecting form, fitting to one of the openings of the orifice member.

5. The liquid-sealed vibration-proof device as set forth in claim 2, wherein the annular wall section of the orifice member at its inner peripheral surface bulges out inboard of the lower side of the central plate section, forming a radiused curvature portion and the diaphragm portion of the rubber-like elastomer membrane assumes a curved form nearly conforming to the radiused curvature portion.

6. The liquid-sealed vibration-proof device as set forth in claim 2, wherein the open end of the diaphragm portion of the rubber-like elastomer membrane is thick-walled.

7. The liquid-sealed vibration-proof device as set forth in claim 1, wherein the central plate section of the orifice member and the partition plate member have respectively openings communicating with the space.

8. The liquid-sealed vibration-proof device as set forth in claim 1, wherein the elastic membrane of the central plate-form portion assumes a projecting form, fitting to one of the openings of the orifice member.

9. The liquid-sealed vibration-proof device as set forth in claim 1, wherein the annular wall section of the orifice member at its inner peripheral surface bulges out inboard of the lower side of the central plate section, forming a radiused curvature portion and the diaphragm portion of the rubber-like elastomer membrane assumes a curved form nearly conforming to the radiused curvature portion.

10. The liquid-sealed vibration-proof device as set forth in claim 1, wherein the open end of the diaphragm portion of the rubber-like elastomer membrane is thick-walled.

* * * * *